United States Patent [19]

Beal

[11] 4,411,460
[45] Oct. 25, 1983

[54] HOSE COUPLING AND CLAMP
[75] Inventor: Glenn I. Beal, Somerset, Pa.
[73] Assignee: R. M. Smith, Inc., Somerset, Pa.
[21] Appl. No.: 256,149
[22] Filed: Apr. 21, 1981
[51] Int. Cl.³ ............................................. F16L 33/00
[52] U.S. Cl. .................................... 285/243; 285/423
[58] Field of Search ............... 285/373, 419, 243, 112, 285/259, 367, 253, 410, 238, 244, 322, 423, 92; 24/284, 282

[56] References Cited
U.S. PATENT DOCUMENTS

| 387,899 | 8/1888 | Miller | 285/259 X |
|---|---|---|---|
| 1,992,580 | 2/1935 | Pillatsch | 285/238 X |
| 2,152,537 | 3/1934 | Couty | 285/249 |
| 2,761,704 | 9/1956 | Crawford | 285/244 X |

FOREIGN PATENT DOCUMENTS

| 227512 | 1/1959 | Australia | 285/373 |
|---|---|---|---|
| 207657 | 4/1965 | Canada | 285/243 |
| 531558 | 8/1955 | Italy | 285/373 |
| 158642 | 2/1921 | United Kingdom | 285/243 |

Primary Examiner—Dave W. Arola
Attorney, Agent, or Firm—Reed, Smith, Shaw & McClay

[57] ABSTRACT

A hose coupling having a sleeve (12 or 16) connected to a male or female threaded member (10 or 14). A male clamp (20) is connected to a female clamp (22) by a screw (38) that is turned into an extended receiving chuck (28) on the male clamp (20) such that the end of the hose (18) is held in compression between the sleeve (12 or 16) and the male and female clamps (20 and 22). The receiving chuck (28) is located adjacent the arcuate end of a curved surface (26) of the male clamp (20) such that a ring of compression between hose (18) and sleeve (12 or 16) is formed completely around the circumference of the hose.

11 Claims, 5 Drawing Figures

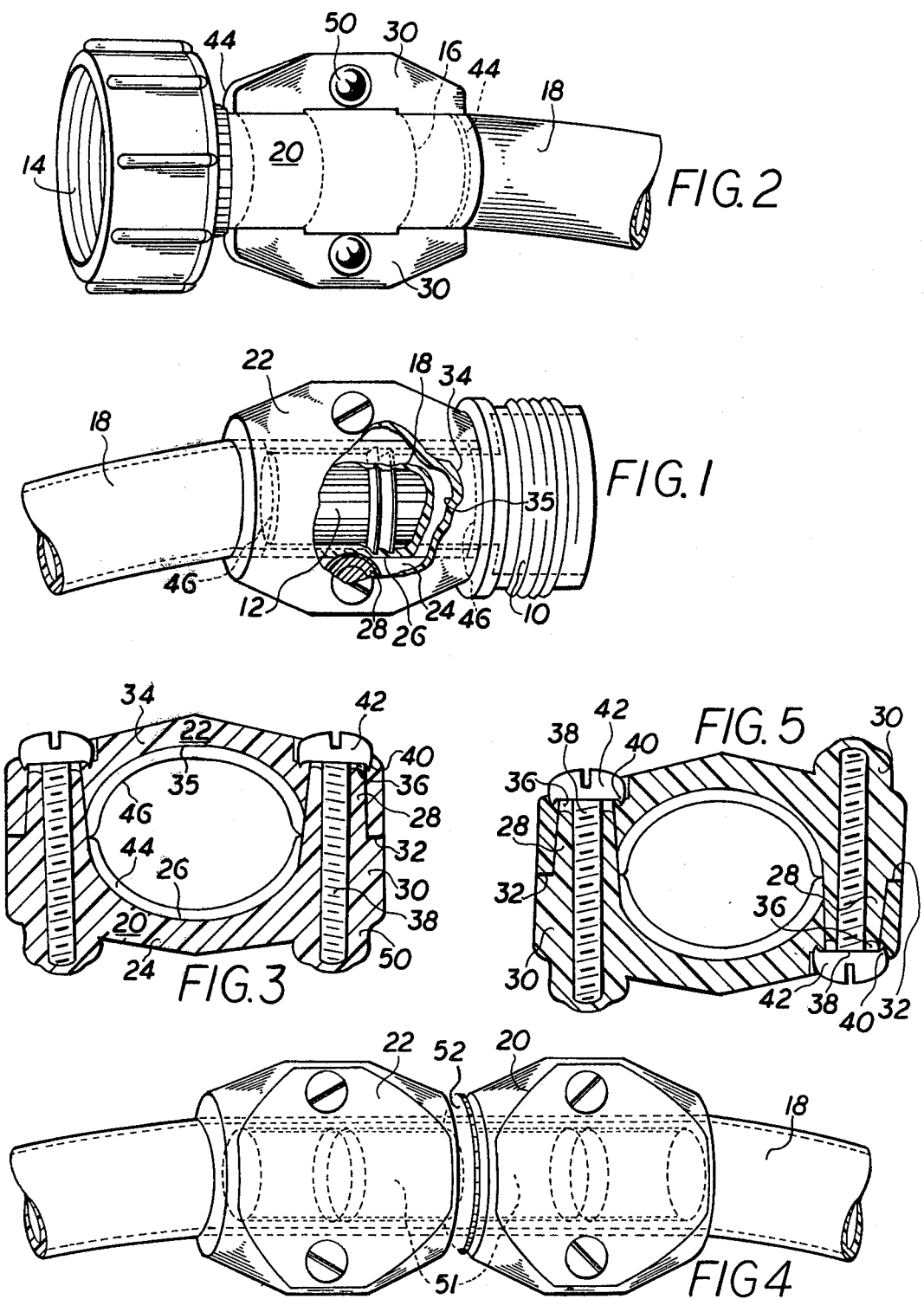

HOSE COUPLING AND CLAMP

BACKGROUND OF THE INVENTION

1. Field of the Invention

The subject invention is related to hose clamps and more particularly, to devices for connecting and repairing soft-walled hose such as lawn and garden hose.

2. Description of the Prior Art

The prior art includes a variety of devices for connecting and coupling hoses. A persistent problem with such hose coupling devices has been that it has been difficult to connect the coupling to soft-walled hoses such that a tight seal is formed.

One type of clamp known in the prior art was designed to provide leak-proof connections by providing pressure completely around the outer circumference of the hose. An example of this type of clamp is shown in U.S. Pat. No. 1,992,580 wherein a two-piece clamp is provided with lugs and complementary cut-out portions in respective pieces of the clamp. The clamp is applied directly to the outer circumference of the hose through a transverse opening in the ferrule coupling member. The clamp of U.S. Pat. No. 1,992,580 does not cooperate with an interior sleeve to compress the hose therebetween and is suitable for use only on self-supporting hoses. Accordingly, couplings of this type are unsuitable for soft-walled hoses such as garden hoses that are not self-supporting.

Many prior art devices used a two-piece clamp that was placed around the outer circumference of the hose and drawn together so as to compress the hose against an inner sleeve. Examples of this mechanism are illustrated in U.S. Pat. Nos. 817,060; 835,300; 867,059; 1,283,554; 1,649,594; 1,777,120; and 4,139,224. The problem with these devices is that the clamps did not provide uniform pressure around the hose circumference. The hose was pinched and distorted between the opposed pieces of the clamp creating a channel between the inner surface of the hose and inner sleeve such that water would leak through this channel.

Accordingly, in the prior art, there was a need for a hose coupling that could be conveniently clamped to a soft walled hose such that it would securely grip the hose forming a water-tight seal.

SUMMARY OF THE INVENTION

In accordance with the subject invention, a hose clamp suitable for use with soft-walled hoses includes a sleeve that fits interiorly into the hose and male and female clamps that are drawn together by fastening means to compress the end of the hose around the sleeve. The male clamp includes a clamping portion having a curved surface and receiving chucks that extend out of said clamping portion such that a portion of the surface of the receiving chuck is adjacent the arcuate ends of the curved surface. The female clamp also includes a clamping portion having a curved surface and has bores in the adjacent arcuate ends of the curved surface for registry with the receiving chucks of the male clamp. The male and female clamps are drawn together by fastening means such as a screw.

Preferably, the male and female clamps include flanges that are located at the arcuate ends of curved surfaces of the male and female clamps with the receiving chucks and bore openings of said male and female clamps being located adjacent the intersection of of the flanges of the clamping portions.

Also preferably, the fastening means is comprised of a screw that has a ring depending from the screw head such that the ring engages the female clamp adjacent the bore opening as the screw is turned into the receiving chuck. In this way, the screw head is not pulled through the bore opening. Also, the male coupling includes a cap that covers one end of said receiving chucks to avoid exposure of pointed or sharp portions of the fastener and to retard corrosion of the fastener.

Alternatively, first and second clamps can be substituted for the male and female clamps. The first and second clamps are substantially the same as the male and female clamps except that each is provided with at least one receiving chuck and at least one bore situated for registry with the receiving chuck of the other clamp.

Other details, objects and advantages of the invention will become apparent as the following description of a presently preferred embodiment thereof proceeds.

BRIEF DESCRIPTION OF THE DRAWINGS

The accompanying drawings show a presently preferred embodiment of the invention in which:

FIG. 1 shows a male hose coupling with portions thereof broken away to better disclose the subject invention;

FIG. 2 shows a female hose coupling with portions thereof broken away to better disclose the subject invention;

FIG. 3 is a cross-sectional view of a hose clamp in accordance with the subject invention;

FIG. 4 shows a hose repair kit with portions thereof broken away to better disclose the subject invention; and FIG. 5 shows an alternative embodiment of a hose clamp as disclosed.

DESCRIPTION OF THE PREFERRED EMBODIMENT

FIGS. 1 and 2 show male and female hose couplings respectively that are in accordance with the subject invention. Such couplings are typically used on soft-walled hose such as garden hose to shorten lengths of hose or to repair breaks in the hose. In FIG. 1, the male hose coupling includes an exteriorly threaded portion 10 and a sleeve member 12 extending from one end thereof. In FIG. 2, the female hose coupling includes an interiorly threaded portion 14 and a sleeve member 16 extending from one end thereof. In the assembled positions shown in FIGS. 1 and 2, sleeves 12 and 16 fit interiorly to the soft-walled hose 18. Male clamps 20 and female clamps 22 are oppositely arranged on the exterior of hose 18 as further described with respect to FIG. 3 such that they cooperate to compress the ends of hose 18 against sleeves 12 and 16.

As shown in FIG. 3, male clamp 20 includes a clamping portion 24 having a curved surface 26 for cradling and maintaining the outer surface of hose 18. Male clamp 20 further includes receiving chucks 28 that extend out of clamping portion 24 such that a portion of the surface of receiving chuck 28 is adjacent the arcuate ends of curved surface 26.

For smaller diameters of hose 18, such as conventional ½ inch or ⅝ inch garden hose, it is preferred that male clamp 20 include flanges 30 which are also located adjacent the arcuate ends of curved surface 26. In this embodiment, receiving chucks 28 extend from the respective faces 32 of flanges 30 adjacent the junction of flanges 30 and clamping portion 24.

Female clamp 22 includes a clamping portion 34 having a curved surface 35 that is similar to surface 26 of clamping portion 24. Female clamp 22 further includes bore openings that are adjacent the arcuate ends of curved surface 35 and that are in registry with receiving chucks 28 such that receiving chucks 28 are insertable into the respective bore openings 36.

Male and female clamps 20 and 22 are drawn together and maintained by fastening means such as screws 38 that extend through the bore openings 36 and into receiving chucks 28. Preferably, screws 38 include a V-shaped ring 40 that depends from the screw head 42. As screws 38 are turned into receiving chuck 28, V-shaped ring 40 engages the female clamp 22 adjacent the circumference of the bore opening 36 such that screw head 42 is not pulled through female clamp 22.

As male and female clamps 20 and 22 are drawn together around hose 18, hose 18 is compressed between clamps 20 and 22 and sleeves 12 and 16 to secure the hose couplings of FIGS. 1 and 2 to the ends of hose 18. The location of the surface of receiving chucks 28 adjacent the arcuate ends of curved surface 26 provides a ring of compressive force that runs completely around the circumference of hose 18. Receiving chucks 28 thus interrupt any channel between the interior of hose 18 and sleeves 12 or 16 that may develop when the hose is elsewhere distorted and pinched between clamping portions 24 and 34 at the arcuate ends of curved surfaces 26 and 35.

Preferably, male and female clamps 20 and 22 are respectively provided with band segments 44 and 46 located at both longitudinal ends of curved surfaces 26 and 35. Band segments 44 of male clamp 20 are in registry with the band segments 46 of female clamp 22 such that the band segments 44 and 46 cooperate to form annular rings at both ends of clamps 20 and 22. These annular rings provide bands of relatively high compression of hose 18 against sleeves 12 and 16 at both ends of male and female clamps 20 and 22.

In applications for commercially available garden hose, screws 38 must be of sufficient length so that male and female clamps 20 and 22 provide sufficient compression of hose 18 against sleeves 12 and 16 to prevent fluid leaks. Specifically, where male clamp 20 is comprised of material having plastic or resilient properties, it is preferred that the shaft length of screw 38 be at least 9/16 inch.

Where the fastening means such as screws 38 are sufficiently long with respect to the length of receiving chucks 28, it is also preferred that male clamp 20 include cap portion 50 on the end of receiving chucks 28 that is oppositely disposed from face 32 of flange 30. Caps 50 thus protect screws 38 against contact with corrosive agents and guard against exposure of pointed or sharp portions of screws 38.

FIG. 4 shows the hose clamp of the subject invention as used in a hose repair kit. The kit includes two male clamps 20, two female clamps 22 and a sleeve member 51 that has a flange 52 located near its central region. In repairing hose 18, the trimmed ends of the hose are placed over opposite ends of sleeve member 51 so that the hose end is adjacent flange 52. Male clamps 20 are then fastened to female clamps 22 as previously described with respect to FIGS. 1-3.

An alternative embodiment of the subject invention is shown in FIG. 5 where male clamp 20 and female clamp 22 have been modified by providing each clamp with at least one receiving chuck 28 and at least one bore 36 as previously described. This alternative embodiment of clamps 20 and 22 is used in the same manner as clamps 20 and 22.

In accordance with the foregoing description, hose couplings are provided that are securely fastened to garden hose or other soft-walled hose in a water-tight seal. While a presently preferred embodiment of the invention is thus shown and described, the invention is not limited thereto but may be otherwise variously embodied within the scope of the following claims.

I claim:

1. A hose clamp system for use with a soft-walled, garden-variety hose, said system comprising:

a hose end member, said member including at one end thereof a portion which is to extend from said hose and at the other end an elongated sleeve portion dimensions to slidingly fit within the end of said hose, said sleeve portion including at least one upraised ridge about its outer surface spaced from said extending end;

a plastic male clamping member having a clamping portion with a first curved inner surface for engaging the outer surface of said hose end into which said sleeve portion is slidingly fit; said first curved inner surface including a first recessed curved portion and a first curved portion upraised relative to said first recessed curved portion, said plastic male clamping member further including spaced, integrally formed plastic chucks that extend out of said clamping portion such that a portion of the surface of said chucks is adjacent the arcuate ends of said first curved inner surface, said plastic chucks including elongated bores extending therethrough and beyond the rear surface of said male clamping member into closed integral plastic mounds thereon;

a plastic female clamping member having a clamping portion with a second curved inner surface for engaging the outer surface of said hose end, said second curved inner surface including a second recessed curved portion and a second curved portion upraised relative to said second recessed curved portion, said plastic female clamping member further including spaced depression areas in registry with said spaced, integrally formed plastic chucks of said male clamping members and shaped to receive said plastic chucks to secure said male and female clamping members in a fixed relative orientation in which said first and second recessed curved portions are in facing relation spaced from said extending portion of said hose end member and in which said first and second upraised curved portions are in facing relation adjacent said extending portion of said hose end member, said depression areas having orifices axially aligned with said elongated bores of said plastic chucks when said plastic chucks are received into said depression areas; and means for fastening said plastic male clamping member to said plastic female clamping member, said fastening means comprising metal self-tapping screw means insertable through said orifices of said plastic female clamping member and self-tappingly engageable into said elongated bores of said plastic chucks, to retain said male and female clamping members together in a fixed clamping position such that said hose end portion adjacent said extending portion of said hose end member is pinched between said sleeve portion and said first and second relatively upraised portions to deform the outer surface thereof to a first degree, and such that said hose end portion in which said at least one upraised ridge is contained is pinched between said sleeve portion and said first and second recessed curved portions to deform the outer surface thereof to a second and lesser degree.

2. The hose clamp system as set forth in claim 1, wherein said elongated bores of said plastic chucks are substantially smooth-bored prior to the insertion of said self-tapping screw means.

3. The hose clamp system as set forth in claim 2, wherein said sleeve portion of said hose end member includes a plurality of upraised ridges, said ridges being beveled in configuration to facilitate sliding entry of said sleeve portion into said hose end and resist removal of said sleeve portion from said hose end.

4. The hose clamp system as set forth in claim 3, wherein said first curved inner surface of said male clamping member includes a third relatively upraised curved portion opposite said first upraised portion from said first recessed curved portion, and wherein said second curved inner surface of said female clamping member includes a fourth relatively upraised curved portion opposite said second upraised portion from said second recessed curved portion, such that said third and fourth upraised portions cooperate to deform the outer surface of the hose end to substantially said first degree, whereby said plurality of upraised ridges are entrapped between said first and second and said third and fourth upraised portions, to prevent inadvertent disassembly of said hose clamp system while rendering said male and female clamping members multi-directional.

5. The hose clamp system as set forth in claim 1, wherein said self-tapping screw means includes threaded shaft means greater in diameter than said elongated bore and an enlarged head portion greater in diameter than said orifices in said female clamping member, said enlarged head portion including a bottom surface having gripping elements for gripping said female clamping member above said orifices to avoid being forced through said orifices.

6. The hose clamp system as set forth in claim 5, wherein said gripping elements include an annular v-shaped ridge adjacent the outer edge of said bottom surface of said enlarged bottom surface of said enlarged head.

7. A hose clamp system for use with a soft-walled, garden-variety hose, said system comprising:

a hose end member, said member including at one end thereof a portion which is to extend from said hose and at the other end an elongated sleeve portion dimensioned to slidingly fit within the end of said hose, said sleeve portion including at least one upraised ridge about its outer surface spaced from said extending end;

a first plastic clamping member having a clamping portion with a first curved inner surface for engaging the outer surface of said hose end into which said sleeve portion is slidingly fit; said first curved inner surface including a first recessed curved portion and a first curved portion upraised relative to said first recessed curved portion, said first plastic clamping member further including a first integrally formed plastic chuck that extends out of said clamping portion such that a portion of the surface of said first chuck is adjacent the arcuate ends of said first curved inner surface, said first plastic chuck including an elongated bore extending therethrough and beyond the rear surface of said first clamping member into a closed integral plastic mound thereon, said first clamping member further including a first depression area spaced opposite said first plastic chuck relative to said first curved inner surface;

a second plastic clamping member having a clamping portion with a second curved inner surface for engaging the outer surface of said hose end, said second curved inner surface including a second recessed curved portion and a second curved portion upraised relative to said second recessed curved portion, said second plastic clamping member further including a second integrally formed plastic chuck that extends out of said clamping portion such that a portion of said second chuck is adjacent the arcuate ends of said second curved inner surface, said second plastic chuck including an elongated bore extending therethrough and beyond the rear surface of said second clamping member into a closed integral plastic mound thereon, said second plastic clamping member further including a second depression area, said first and second depression areas in registry with said second and first integrally formed plastic chucks, respectively, and shaped to receive said plastic chucks to secure said first and second clamping members in a fixed relative orientation in which said first and second recessed curved portions are in facing relation spaced from said extending portion of said hose end member and in which said first and second upraised curved portions are in facing relation adjacent said extending portion of said hose end member, said depression areas having orifices axially aligned with said elongated bores of said plastic chucks when said plastic chucks are received into said depression areas; and means for fastening said first plastic clamping member to said second plastic clamping member, said fastening means comprising metal self-tapping screw means insertable through said orifices of said first and second depression areas and self-tappingly engageable into said elongated bores of said plastic chucks, to retain said first and second clamping members together in a fixed clamping position such that said hose end portion of said hose end member is pinched between said sleeve portion and said first and second relatively upraised portions to deform the outer surface thereof to a first degree, and such that said hose end portion in which said at least one upraised ridge is contained is pinched between said sleeve portion and said first and second recessed curved portions to deform the outer surface thereof to a second and lesser degree.

8. The hose clamp system as set forth in claim 7, wherein said elongated bores of said plastic chucks are substantially smooth-bored prior to the insertion of said self-tapping screw means.

9. The hose clamp system as set forth in claim 8, wherein said sleeve portion of said hose end member includes a plurality of upraised ridges, said ridges being beveled in configuration to facilitate sliding entry of said sleeve portion into said hose end and resist removal of said sleeve portion from said hose end.

10. The hose clamp system as set forth in claim 8, wherein said self-tapping screw means includes threaded shaft means greater in diameter than said elongated bore and an enlarged head portion greater in diameter than said orifices in said female clamping member, said enlarged head portion including a bottom surface having gripping elements for gripping said female clamping member above said orifices to avoid being forced through said orifices.

11. The hose clamp system as set forth in claim 10, wherein said gripping elements include an annular v-shaped ridge adjacent the outer edge of said bottom surface of said enlarged head.

* * * * *

UNITED STATES PATENT AND TRADEMARK OFFICE
CERTIFICATE OF CORRECTION

PATENT NO. : 4,411,460
DATED : October 25, 1983
INVENTOR(S) : GLENN I. BEAL

It is certified that error appears in the above-identified patent and that said Letters Patent are hereby corrected as shown below:

Column 7, line 3, after "claim" delete "8" and substitute therefor -- 7 --.

Signed and Sealed this

Sixth Day of March 1984

[SEAL]

Attest:

Attesting Officer

GERALD J. MOSSINGHOFF

Commissioner of Patents and Trademarks